(No Model.)

C. SHAFER.
STALK CUTTER.

No. 585,484. Patented June 29, 1897.

WITNESSES:
William P. Goebel.

INVENTOR
C. Shafer.
BY
ATTORNEYS.

UNITED STATES PATENT OFFICE.

CHARLES SHAFER, OF BEDFORD, NEBRASKA.

STALK-CUTTER.

SPECIFICATION forming part of Letters Patent No. 585,484, dated June 29, 1897.

Application filed February 5, 1897. Serial No. 622,085. (No model.)

*To all whom it may concern:*

Be it known that I, CHARLES SHAFER, of Bedford, in the county of Nemaha and State of Nebraska, have invented a new and Improved Stalk-Cutter, of which the following is a full, clear, and exact description.

My invention relates to stalk-cutters especially adapted for cutting cornstalks in the field.

The object of the invention is to provide an attachment to the riding-frame of a reaper, mower, or a like machine, which attachment will force the stalks close to the ground and cut said stalks in predetermined lengths while in said recumbent position.

Another object of the invention is to construct an attachment for the purpose above described which will be simple, durable, and economic and readily applied to any form of truck having the necessary driving-gear.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
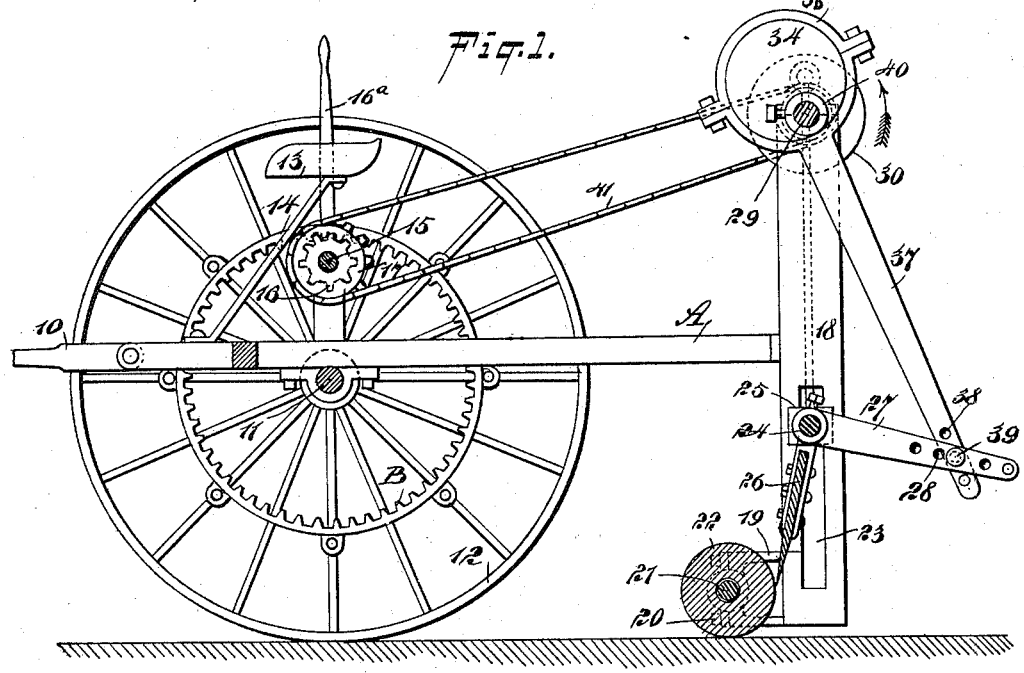
Figure 2:
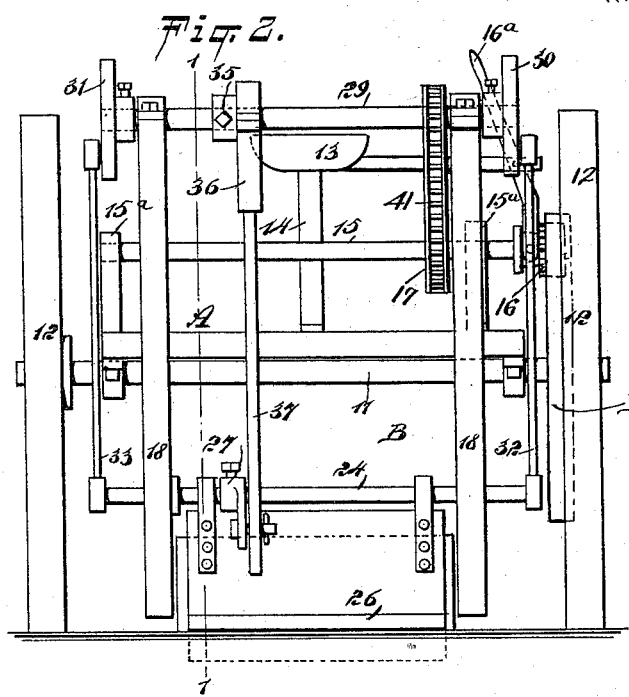
Figure 3:
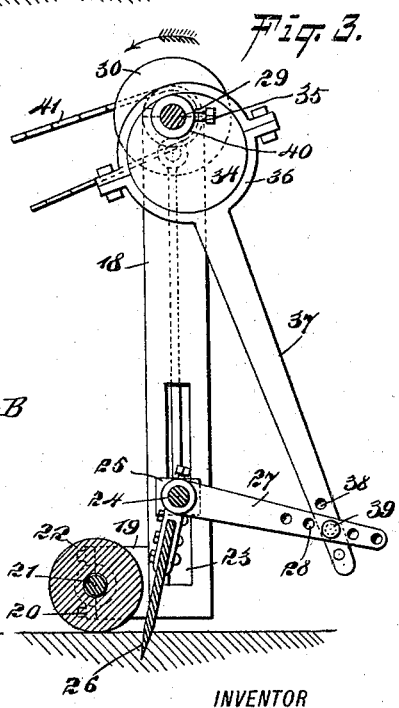

Figure 1 is a vertical section through the machine, the knife being on the point of making the downstroke, the said section being taken practically on the line 1 1 of Fig. 2. Fig. 2 is a rear elevation; and Fig. 3 is a vertical section through the attachment, illustrating the knife in its lowest position.

The attachment may be applied to any form of truck. The truck which is preferably used is the truck portion of a reaper or mower, in which a frame A is provided with a limber tongue 10, and an axle 11 is journaled upon the frame in the usual manner, the wheels 12 being mounted on the axle, so as to revolve the latter. The seat 13 is usually placed over the axle, being supported by a standard 14, in order that the weight of the driver may be brought fairly between the two supporting-wheels 12. Above the axle a shaft 15 is journaled in suitable bearings 15ª, attached to the frame A. An internally-toothed wheel B is secured upon one of the ground-wheels 12, into which an end of the shaft 15 extends. The shaft 15 is provided with a pinion 16, held to slide thereon and turn therewith, which pinion meshes with the teeth of the internally-geared wheel B, which in this case is the master-gear. The pinion 16 may be carried into or out of engagement with the teeth of the master-gear through the medium of the shifting-lever 16ª, located conveniently to the driver's seat. Near one end of the shaft 15 a sprocket-wheel 17 is firmly secured.

Two uprights 18 are attached in any suitable or approved manner to the rear end of the frame A, which uprights are shown particularly in Fig. 2. Each upright at its lower end has a forwardly-extending bracket 19, and each bracket is provided with a box 20, the said boxes receiving the trunnions or the shaft 21 of a roller 22, which is adapted to travel on the ground and to support the attachment. Each upright 18 has a longitudinal slot 23 made in its lower portion, as shown in Figs. 1 and 3. A shaft 24 extends from one upright to the other, and preferably the said shaft is provided with sliding blocks 25, which have guided movement in the slotted portions of the uprights. A blade 26 is secured to the said shaft between the uprights, the blade being adapted to approach the upper portion of the roller 22 at its rear in its upper position and to clear the roller at the rear and enter the ground when in its lowest position, as illustrated, respectively, in Figs. 1 and 2.

An arm 27 is attached to the knife-carrying shaft 24. The arm 27 extends rearwardly and is provided with a series of apertures 28. In the upper end of the uprights 18 a driven shaft 29 is journaled. This driven shaft carries at one end a crank-disk 30 and at the opposite end a similar crank-disk 31, the two crank-disks being connected by pitmen 32 and 33, respectively, with the right and left hand ends of the knife-shaft 24.

An eccentric 34 is secured on the driven shaft 29, preferably in an adjustable manner, and this may be accomplished by securing the eccentric to the shaft by means of a set-screw 35. The eccentric has the usual eccentric-strap 36, and an arm 37 is projected downwardly and rearwardly from the strap, having apertures 38 at its lower end, and the apertured portion of the eccentric-arm 37 is connected with the apertured portion of the arm 27, extending from the knife-shaft, through the medium of a pin 39 or the equivalent of the same.

According to the adjustment of the eccentric-arm on the knife-shaft arm the inclination of the knife in its movement to and from the roller 22 will be more or less in a forward or a rearward direction. A sprocket-wheel 40 (shown in dotted lines in Figs. 1 and 3) is secured on the driven shaft 29, carrying the eccentric and the crank-disks, and, as shown, a chain-belt 41 is passed around the sprocket-wheel 40 on the driven or eccentric shaft and around the sprocket-wheel 17 on the shaft carried by the frame A of the truck.

In operation, as the machine is advanced the cornstalks will be drawn down to a certain extent by passing under the axle 11 of the truck-frame, and as soon as the roller 22 reaches the roots of the stalks the said stalks will be forced flat to the ground by said roller and held in that position, while the knife is reciprocated, through the medium of the devices hereinbefore specified, at such periods as to cut the stalks in predetermined lengths. The stalks may be cornstalks, cotton-stalks, or the stalks of any plant that it is desirable to cut into lengths.

The driving mechanism is shown at the right-hand side of the machine, but may be, and preferably will be, placed at the left-hand side.

Having thus described my invention, I claim as new and desire to secure by Letters Patent—

1. The combination with the truck, of uprights connected therewith, a shaft arranged to slide in said uprights and carrying a knife, a driven shaft mounted to rotate in said uprights, a connection between said driven shaft and said knife-shaft and by which a reciprocating and partially-rotating movement is given to said knife, and means for operating said driven shaft, substantially as shown and described.

2. In a stalk-cutter, a truck, uprights connected with the truck, a roller located in advance of the uprights, supporting the same, a knife having a reciprocating movement in the uprights, and an eccentric controlling the movement of the knife, and a driving mechanism on the truck operating the said eccentric, substantially as shown and described.

3. In a stalk-cutter, uprights having longitudinal slots therein, a shaft held to slide in the said slots, a roller connected with and located in advance of the uprights at their lower ends, a knife attached to the said shaft, the shaft being capable of a rocking movement, an arm projected from the shaft, a driven shaft above the knife-shaft, an eccentric carried by the driven shaft and connected with the arm of the knife-shaft, and means for operating the said eccentric, as and for the purpose specified.

4. In a stalk-cutter, uprights provided with longitudinal slots at their lower ends, a shaft held to turn and to slide in the slots of the upright, a roller carried by the uprights at the front lower portion thereof, an arm projected from the knife-shaft, a driven shaft, means for driving the said shaft substantially as described, an eccentric carried by the driven shaft and having adjustable connection with the arm of the knife-shaft, and crank-disks attached to the driven shaft and having pitman connection with the knife-shaft, as and for the purpose specified.

5. The combination, with a truck provided with a limber tongue, a gear secured to the axle of the truck, a shaft located above the axle, a pinion connected with the said upper shaft and meshing with the gear on the axle, and a shifting mechanism for the said gear, of a cutting attachment located at the rear of the said truck, the said cutting attachment comprising uprights having slots therein, a shaft held to turn in the said slots and having vertical movement therein, a knife carried by the said shaft, a roller journaled in bearings located in advance of the lower portion of the said uprights, to and from which the knife has movement, an arm rearwardly projected from the knife-shaft, a shaft located in the upper portion of the uprights, driven from the upper shaft on the truck, crank-disks located on the shaft in advance of the uprights and connected with the ends of the knife-shaft, an eccentric located upon the upper shaft in the uprights, and a connection between the said eccentric and the arm of the knife-shaft, as and for the purpose set forth.

6. The combination with the truck having traveling wheels, of the uprights connected therewith, a shaft carried by said uprights and having an arm projected therefrom, a knife attached to said shaft, a driven shaft mounted to rotate in said uprights above said knife-shaft, crank-disks on said driven shaft and having pitman connection with said knife-shaft, an eccentric on said driven shaft and adjustably connected with the arm of the knife-shaft, gearing connecting said traveling wheels with said driven shaft, and means for throwing said driven shaft in and out of gear, substantially as shown and described.

7. In a stalk-cutter, the combination with the truck, of the uprights connected therewith and provided with vertical slots, a shaft held to slide in said slots, a knife attached to said shaft, an arm projected from the shaft, a driven shaft above the knife-shaft, a pitman connection between said driven shaft and said knife-shaft, an eccentric on said shaft and adjustably connected with the arm of the knife-shaft, gearing connecting said driven shaft with the traveling wheels of the truck, and means for forcing the stalks to the ground in advance of the cutting mechanism, substantially as shown and described.

CHARLES SHAFER.

Witnesses:
JOHN WIXON,
JAMES R. CAIN, Jr.